US009087258B2

United States Patent
Yu et al.

(10) Patent No.: US 9,087,258 B2
(45) Date of Patent: Jul. 21, 2015

(54) METHOD FOR COUNTING OBJECTS AND APPARATUS USING A PLURALITY OF SENSORS

(75) Inventors: Jaeshin Yu, Uiwang (KR); Sungjin Kim, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 136 days.

(21) Appl. No.: 13/816,304

(22) PCT Filed: Aug. 17, 2010

(86) PCT No.: PCT/KR2010/005430
§ 371 (c)(1),
(2), (4) Date: Feb. 11, 2013

(87) PCT Pub. No.: WO2012/023639
PCT Pub. Date: Feb. 23, 2012

(65) Prior Publication Data
US 2013/0136307 A1    May 30, 2013

(51) Int. Cl.
*G06K 9/32* (2006.01)
*H04N 7/18* (2006.01)
*G06K 9/00* (2006.01)
*G06T 7/00* (2006.01)

(52) U.S. Cl.
CPC .......... *G06K 9/3241* (2013.01); *G06K 9/00201* (2013.01); *G06K 9/00778* (2013.01); *G06T 7/0083* (2013.01); *H04N 7/181* (2013.01); *G06T 2207/10028* (2013.01); *G06T 2207/30242* (2013.01)

(58) Field of Classification Search
CPC .................................................. G06K 9/3241
USPC ......................................................... 382/103
See application file for complete search history.

(56) References Cited

U.S. PATENT DOCUMENTS

| | | | |
|---|---|---|---|
| 6,940,538 B2 | 9/2005 | Rafey et al. | |
| 2003/0043270 A1* | 3/2003 | Rafey et al. | 348/157 |
| 2003/0235331 A1* | 12/2003 | Kawaike et al. | 382/154 |
| 2009/0010490 A1 | 1/2009 | Wang et al. | |
| 2011/0293137 A1* | 12/2011 | Gurman et al. | 382/103 |

(Continued)

FOREIGN PATENT DOCUMENTS

| | | |
|---|---|---|
| CN | 1647097 A | 7/2005 |
| CN | 1950722 A | 4/2007 |

(Continued)

OTHER PUBLICATIONS

International Search Report issued in PCT Application No. PCT/KR2010/005430 dated May 2, 2011.

(Continued)

*Primary Examiner* — Stephen R Koziol
*Assistant Examiner* — Delomia Gilliard
(74) *Attorney, Agent, or Firm* — Ked & Associates, LLP (57) ABSTRACT

According to one embodiment of the present invention, a method for counting objects involves using an image sensor and a depth sensor, and comprises the steps of: acquiring an image from the image sensor and acquiring a depth map from the depth sensor, the depth map indicating depth information on the subject in the image; acquiring boundary information on objects in the image; applying the boundary information to the depth map to generate a corrected depth map; identifying the depth pattern of the objects from the corrected depth map; and counting the identified objects.

7 Claims, 6 Drawing Sheets

(56) References Cited

U.S. PATENT DOCUMENTS

2013/0215148 A1* 8/2013 Antonyuk et al. ............ 345/633
2013/0236058 A1* 9/2013 Wang et al. .................. 382/103

FOREIGN PATENT DOCUMENTS

| | | |
|---|---|---|
| KR | 10-2004-0030081 | 4/2004 |
| KR | 10-0808543 | 2/2008 |
| KR | 10-0881230 | 2/2009 |

OTHER PUBLICATIONS

Chinese Office Action issued in related Application No. 201080068622.8 dated May 22, 2015 (No English Translation Attached).

* cited by examiner

FIG. 7

METHOD FOR COUNTING OBJECTS AND APPARATUS USING A PLURALITY OF SENSORS

TECHNICAL FIELD

The present invention relates to a method and apparatus for counting objects, and more particularly, to a method and apparatus for counting the number of objects using a plurality of sensors.

BACKGROUND ART

Recently, a monitoring system which interworks with a camera apparatus provides not only a basic function to demonstrate or record image information on an area of interest, but also a function to track or count objects such as persons traversing the area of interest, based on the image information.

DISCLOSURE OF THE INVENTION

Therefore, an object of the present invention is to provide a method for counting objects using not only a foreground image acquired by a system for counting objects based on image information, but also other information associated with the image information.

Another object of the present invention is to provide a method for determining whether a camera apparatus for counting objects of interest has been properly installed above an area of interest, in a system for counting objects.

To achieve these and other advantages and in accordance with the purpose of the present invention, as embodied and broadly described herein, there is provided a method for counting objects of interest using an image sensor and a depth sensor, the method comprising: acquiring an image by the image sensor, and acquiring a depth map from the depth sensor, the depth map indicating depth information on the subject in the image; acquiring edge information of objects of interest in the image; generating a corrected depth map by applying the edge information to the depth map; identifying depth patterns of the objects of interest from the corrected depth map; and counting the identified objects of interest.

In the step of identifying depth patterns of the objects of interest, depth patterns of a reference object stored in a depth pattern database, may be compared with the depth patterns of the corrected depth map.

The method may further comprise tracking movement of the depth patterns of the identified objects of interest.

To achieve these and other advantages and in accordance with the purpose of the present invention, as embodied and broadly described herein, there is also provided a camera apparatus, comprising: an image sensor configured to generate an image captured with respect to objects of interest; a depth sensor configured to generate a depth map indicating depth information on the subject in the image; and a controller configured to acquire edge information on the objects of interest in the image, configured to generate a corrected depth map by applying the edge information to the depth map, configured to identify depth patterns of the objects of interest from the corrected depth map, and configured to count the identified objects of interest.

The camera apparatus may further comprise a memory configured to store therein a depth pattern database for storing depth patterns of a reference object at different angles, and the controller may identify depth patterns of the objects of interest, from the corrected depth map, using the depth patterns of the reference object at different angles.

To achieve these and other advantages and in accordance with the purpose of the present invention, as embodied and broadly described herein, there is also provided an apparatus for counting objects, comprising: a transceiver configured to receive an image captured with respect to objects of interest, and a depth map indicating depth information on the subject in the image; and a controller configured to acquire edge information on the objects of interest in the image, configured to generate a corrected depth map by applying the edge information to the depth map, configured to identify depth patterns of the objects of interest from the corrected depth map, and configured to count the identified objects of interest.

The apparatus may further comprise a memory configured to store therein a depth pattern database for storing depth patterns of a reference object at different angles, and the controller may identify depth patterns of the objects of interest, from the corrected depth map, using the depth patterns of the reference object at different angles.

To achieve these and other advantages and in accordance with the purpose of the present invention, as embodied and broadly described herein, there is also provided a method for displaying an installation state of a camera apparatus having an image sensor and a depth sensor, the method comprising: acquiring an image captured with respect to objects of interest by the image sensor, and acquiring a depth map from the depth sensor, the depth map indicating depth information on the subject in the image; calculating an installation height of the camera apparatus based on the depth information, and determining whether the installation height is proper or not; calculating installation angles of the image sensor and the depth sensor based on the depth map and a depth pattern database, and determining whether the installation angles are proper or not, wherein the depth pattern database stores therein depth patterns of a reference object at different angles, and wherein the installation angles of the image sensor and the depth sensor are calculated by comparing depth patterns of the objects of interest extracted from the depth map, with the depth patterns of the reference object at different angles included in the depth pattern database; and displaying determination results on whether the installation height and the installation angles are proper or not.

The depth patterns of the objects of interest may be extracted by generating a corrected depth map by applying edge information on the objects of interest acquired from the image, to the depth map, and then by identifying the depth patterns of the objects of interest from the corrected depth map.

The determination results on whether the installation height and the installation angles are proper or not, may be displayed on a display attached to the camera apparatus, or on a display of a remote apparatus connected to the camera apparatus.

The display may be implemented as at least one lamp. And, the camera apparatus may control an on-off state, a blinking interval, a color or an intensity of illumination of said at least one lamp, based on the determination results on whether the installation height and the installation angles are proper or not.

To achieve these and other advantages and in accordance with the purpose of the present invention, as embodied and broadly described herein, there is also provided a method for detecting an installation state of a camera apparatus having an image sensor and a depth sensor, by a remote apparatus connected to the camera apparatus, the method comprising: receiving, from the camera apparatus, an image captured with respect to objects of interest, and a depth map indicating depth information on the subject in the image; calculating an installation height of the camera apparatus based on the depth information, and determining whether the installation height is proper or not; calculating installation angles of the image sensor and the depth sensor based on the depth map and a depth pattern database, and determining whether the installation angles are proper or not, wherein the depth pattern database stores therein depth patterns of a reference object at different angles, and wherein the installation angles of the image sensor and the depth sensor are calculated by comparing depth patterns of the objects of interest extracted from the depth map, with the depth patterns of the reference object at different angles included in the depth pattern database; and displaying determination results on whether the installation height and the installation angles are proper or not.

The method may further comprise transmitting, to the camera apparatus, the determination results on whether the installation height and the installation angles are proper or not.

To achieve these and other advantages and in accordance with the purpose of the present invention, as embodied and broadly described herein, there is also provided a camera apparatus, comprising: an image sensor configured to generate an image captured with respect to objects of interest; a depth sensor configured to generate a depth map indicating depth information on the subject in the image; a memory configured to store therein a depth pattern database for storing depth patterns of a reference object at different angles; a controller configured to calculate an installation height of the camera apparatus based on the depth information, configured to calculate installation angles of the image sensor and the depth sensor based on the depth map and the depth pattern database, and configured to determine whether the installation height and the installation angles are proper or not, wherein the installation angles of the image sensor and the depth sensor are calculated by comparing depth patterns of the objects of interest extracted from the depth map, with the depth patterns of the reference object at different angles included in the depth pattern database; and a display configured to display determination results on whether the installation height and the installation angles are proper or not.

The depth patterns of the objects of interest may be extracted by generating a corrected depth map by applying edge information on the objects of interest acquired from the image, to the depth map, and then by identifying the depth patterns of the objects of interest from the corrected depth map.

The display may be implemented as at least one lamp. And, the controller may control an on-off state, a blinking interval, a color or an intensity of illumination of said at least one lamp, based on the determination results on whether the installation height and the installation angles are proper or not.

To achieve these and other advantages and in accordance with the purpose of the present invention, as embodied and broadly described herein, there is also provided an apparatus for counting objects, comprising: a transceiver configured to receive, from a camera apparatus, an image captured with respect to objects of interest, and a depth map indicating depth information on the subject in the image; a memory configured to store therein a depth pattern database for storing depth patterns of a reference object at different angles; a controller configured to calculate an installation height of the apparatus based on the depth information, configured to calculate installation angles of the image sensor and the depth sensor based on the depth map and the depth pattern database, and configured to determine whether the installation height and the installation angles are proper or not, wherein the installation angles of the image sensor and the depth sensor are calculated by comparing depth patterns of the objects of interest extracted from the depth map, with the depth patterns of the reference object at different angles included in the depth pattern database; and a display configured to display determination results on whether the installation height and the installation angles are proper or not.

The depth patterns of the objects of interest may be extracted by generating a corrected depth map by applying edge information on the objects of interest acquired from the image, to the depth map, and then by identifying the depth patterns of the objects of interest from the corrected depth map.

The display may be implemented as at least one lamp. And, the controller may control an on-off state, a blinking interval, a color or an intensity of illumination of said at least one lamp, based on the determination results on whether the installation height and the installation angles are proper or not.

The present invention can have the following effects.

In the apparatus for counting objects of interest according to the present invention, the number of objects traversing an area of interest can be calculated with a relatively lower error rate, by reducing errors occurring when detecting objects of interest from image information.

In the apparatus for counting objects of interest according to the present invention, there is provided a function to determine whether a camera apparatus has been properly installed or not, in order to acquire information suitable for detecting objects of interest.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Figure 1:
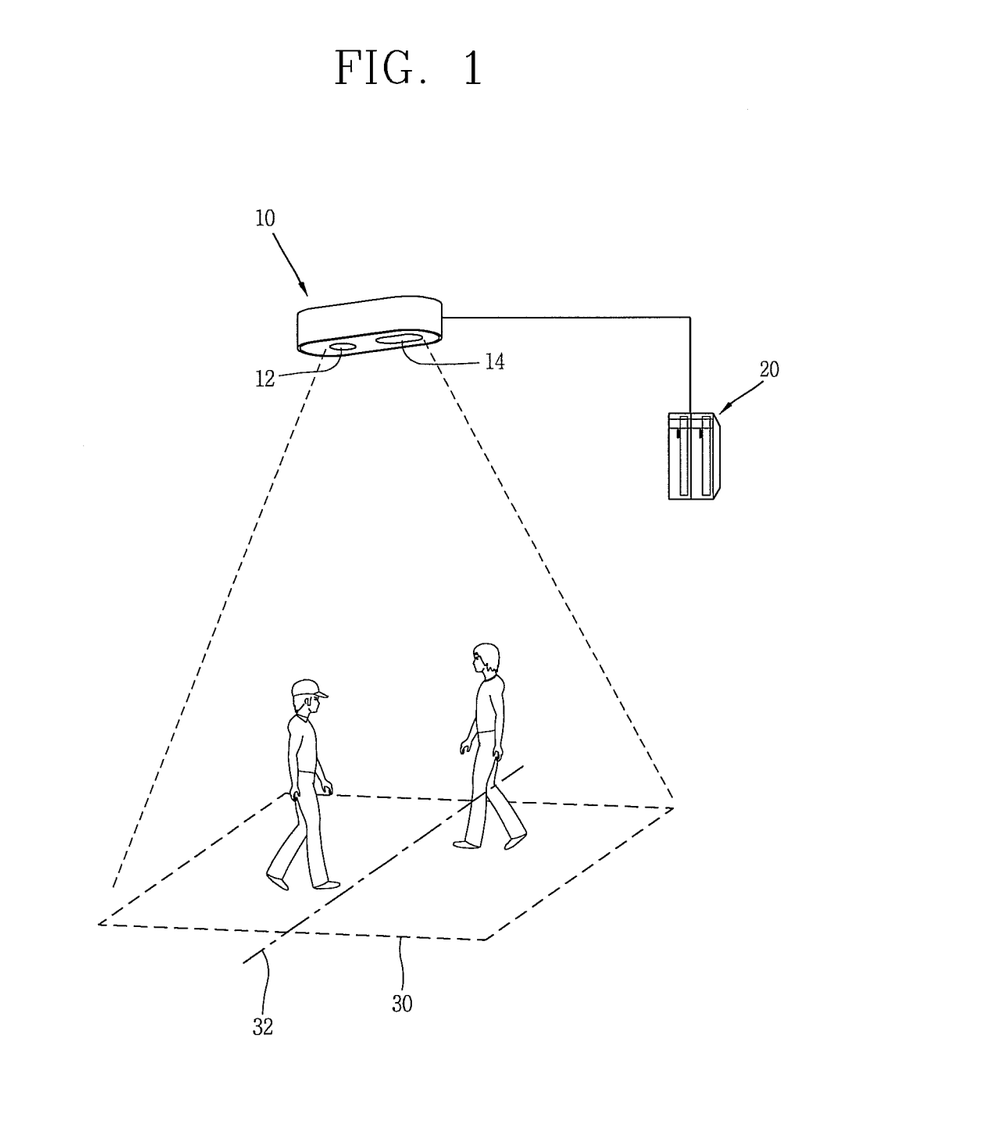
FIG. 1 is an exemplary view of a system for counting objects according to the present invention.

FIG. 1 is an exemplary view of a system for counting objects according to the present invention.

As shown in FIG. 1, the system for counting objects according to the present invention comprises a camera apparatus 10 installed at an area of interest 30, a remote apparatus 20 connected to the camera apparatus 10, etc. The camera apparatus 10 is provided with an image sensor 12 for acquiring image information on the area of interest 30, and a depth sensor 14 for acquiring a depth map indicating depth information on objects included in the image information. The system for counting objects is configured to count objects traversing a reference line 32 in the area of interest 30, based on the image information and the depth map acquired from the camera apparatus 10.

Figure 2:
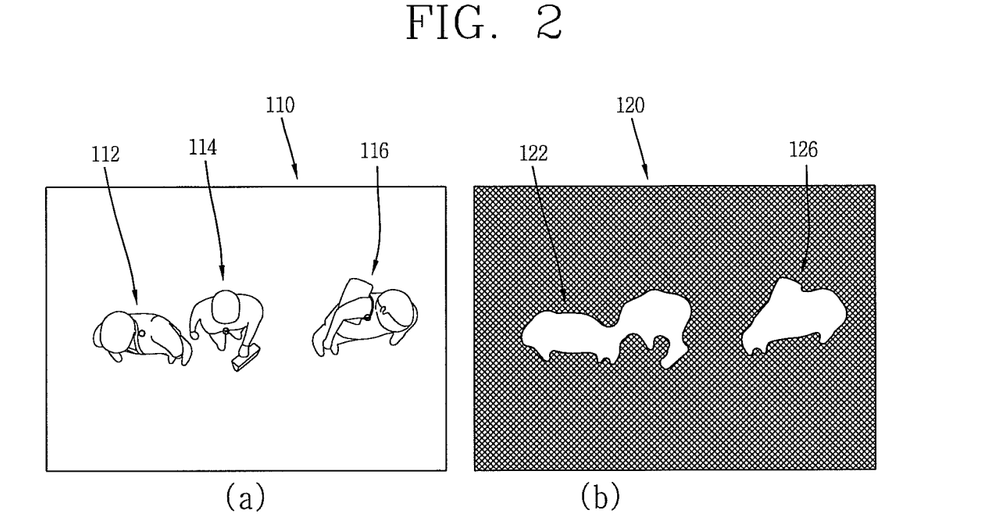
FIG. 2 is an exemplary view of image information processed in a system for counting objects.

FIG. 2 is an exemplary view of image information processed in a system for counting objects.

The system for counting objects may acquire an original image 110 of an area of interest shown in FIG. 2A, by the image sensor attached to the camera apparatus. The system for counting objects extracts a foreground image 120 of FIG. 2B from the original image 110, using an object detect engine mounted therein, and counts objects included in the foreground image 120, thereby counting objects traversing the area of interest.

However, such general method using a foreground image cannot precisely count objects, unless it utilizes additional information for object detection. For instance, in a case where a plurality of objects displayed in the foreground image are close to each other, the plurality of objects may be recognized as a single object (which is called 'object grouping'). Referring to FIG. 2A, the system for counting objects is configured to count human objects of interest. The original image 110 acquired by the system for counting objects is implemented by capturing objects in an area of interest including objects of interest 112, 114 and 116, as the subject. The system for counting objects may acquire the foreground image 120 of FIG. 2B, from the original image 110, using a general object detect engine. In the foreground image 120, the objects 112 and 114 different from each other even if they are close to each other, may be displayed as a single object 122. Accordingly, if the system counts objects of interest based on only the foreground image 120, there may occur errors. In order to solve such object grouping, part in the foreground image where objects overlap each other may be divided by size information such as a width of the objects. However, in this case, there may still occur errors in precisely counting objects, because all of the objects overlapping each other are not objects of interest.

The method for counting objects using only a foreground image may have another problem contrary to the aforementioned 'object grouping', that is, 'over segmentation' where a single object in the foreground image is recognized as a plurality of objects due to various causes including reflection of light. The method for counting objects using only a foreground image, has a difficulty in detecting objects of interest, because objects having similar colors to a neighboring object in the original image are not well identified, and because it is difficult to precisely check the outlines of the objects. Further, in the process of extracting the foreground image from the original image, part of the original image rather than the objects of interest, such as a background image (e.g., shadow occurring due to illumination, etc.) may be recognized as the objects of interest.

A method for counting objects according to the present invention will be explained with reference to FIGS. 3 to 5. As explained later with reference to FIG. 3, in the method for counting objects according to the present invention, the number of objects of interest traversing an area of interest is calculated, based on information including an original image on the area of interest acquired from an image sensor, a depth map acquired from a depth sensor, and depth patterns of the objects of interest. When compared with the aforementioned method for counting objects using only a foreground image, the method for counting objects according to the present invention has the following advantages. Firstly, a background image is removed by the depth information. Further, can be reduced errors occurring due to neighboring objects having similar colors to the objects of interest, and due to shadows of the objects of interest.

Figure 3:
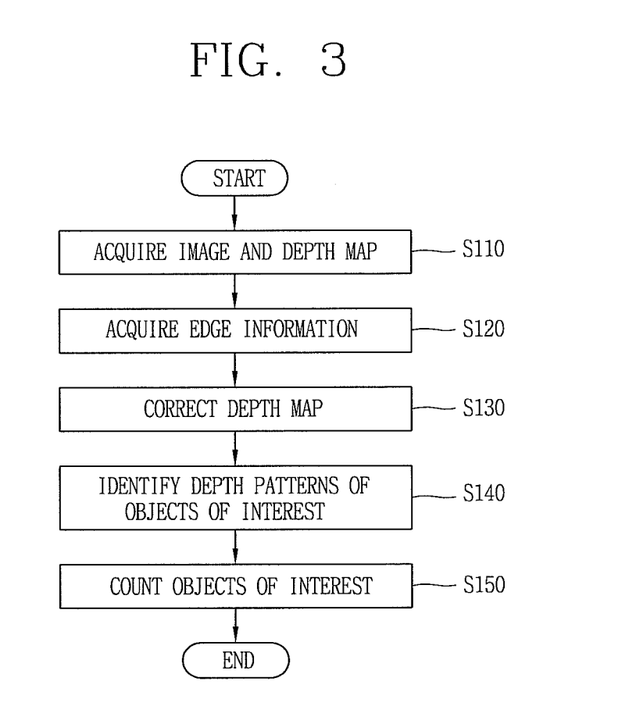
FIG. 3 is a flowchart showing a method for counting objects of interest in a system for counting objects according to the present invention.

FIG. 3 is a flowchart showing a method for counting objects of interest in a system for counting objects according to the present invention.

Firstly, the system for counting objects acquires an original image of an area of interest from an image sensor of a camera apparatus, and acquires a depth map of the area of interest from a depth sensor of the camera apparatus (S110). The depth map is data indicating a distance of each part of a subject from the camera apparatus (or depth information), the subject such as objects in the depth map to be captured by the camera apparatus having the depth sensor attached thereto. The depth map is implemented in order to provide additional information to information extracted from the original information for counting objects. Preferably, the depth map and the original image include the same area of interest.

Next, the system for counting objects extracts edge information (boundary information) from the original image (S120), and compensates for the depth map using the extracted edge information (S130). The edge information is extracted information on objects in the original image. As the edge information is applied to the depth map acquired from the depth sensor, a corrected depth map is generated.

Next, the system for counting objects identifies depth patterns of objects of interest, from the corrected depth map (S140). The depth patterns of the objects of interest are obtained through an object modeling with respect to the objects of interest, which will be explained later with reference to FIG. 5. The system for counting objects may identify depth patterns of objects of interest. For instance, when a result value obtained by comparing depth patterns of objects included in the corrected depth map with the depth patterns of the objects of interest, is more than a prescribed threshold, the system determines the captured objects as objects of interest.

Next, the system counts the identified objects of interest (S150). In counting the identified objects of interest, the system may count the identified objects of interest in a simple manner. As another method, the system may more precisely count the identified objects of interest, through tracking of movements of the identified objects of interest, by repeatedly performing the aforementioned steps using original images and depth maps consecutively acquired by the camera apparatus according to lapse of time. In the method for counting objects of interest through tracking, the number of objects of interest may be more precisely calculated, by using similar colors of objects of interest which can be extracted from the consecutively-acquired original images. In the method for counting objects of interest through tracking, the number of objects of interest may be more precisely calculated, by predicting the next positions obtained from the consecutively-acquired original images and depth maps, using the Kalman filter. In the system for counting objects according to the present invention, objects of interest moving out of the reference line 32 of the area of interest 30, and objects of interest moving towards the reference line 32 may be distinguished from each other, by using the tacking method.

Hereinafter, will be explained modification examples of the method for counting objects according to the present invention.

In the method for counting objects according to the present invention, the respective steps S110~S150 of FIG. 3 may be executed by the camera apparatus 10 of the system.

In a method for counting objects according to modification examples of the present invention, information on original images and depth maps acquired by the camera apparatus 10 of the system may be transmitted to the remote controller 20 connected to the camera apparatus 10, and the respective steps S120~S150 of FIG. 3 may be executed by the remote controller 20.

Hereinafter, information processed by the system for counting objects according to the present invention will be explained with reference to FIG. 4.

Figure 4:
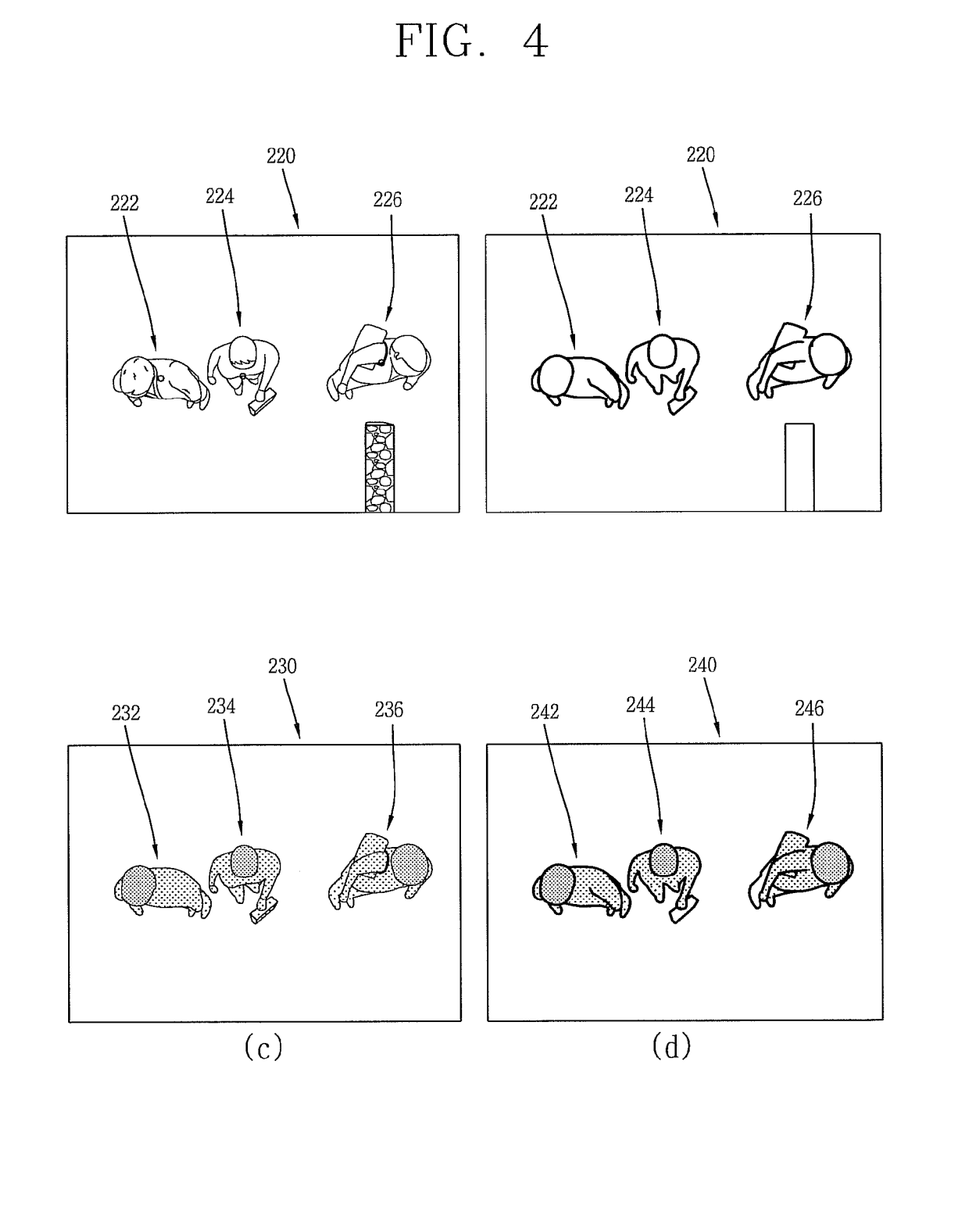
FIG. 4 is an exemplary view of image information processed for counting objects of interest in a system for counting objects according to the present invention.

FIG. 4 is an exemplary view of image information processed for counting objects of interest in a system for counting objects according to the present invention.

Referring to FIG. 4A, the system for counting objects is configured to count human objects of interest. An original image 210 acquired by the system for counting objects is implemented by capturing objects in an area of interest including objects of interest 212, 214 and 216, as the subject. The original image 210 further includes a background region 218 having a distinguished color, rather than the objects of interest 212, 214 and 216.

Referring to FIG. 4B, the system for counting objects may extract edge information 220, from the original image 210. The objects 212 and 214 different from each other even if they are close to each other in the original image 210 of FIG. 4A, may be displayed on the edge information 220 as a single object. Further, the edge information 220 may include edge information on the background region 218 having a distinguished color and included in the original image 210. Accordingly, a depth map indicating depth information of an area of interest, as well as the edge information 220, may be used as later explained.

Referring to FIG. 4C, the system for counting objects may acquire a depth map 230 from the depth sensor of the camera apparatus. The depth map is data indicating a distance of each part of a subject from the camera apparatus (or depth information), the subject such as objects in the depth map to be captured by the camera apparatus having the depth sensor attached thereto. Distance information which cannot be acquired from the original image 210, can be acquired based on the depth information in the depth map. The depth map is implemented in order to provide additional information to information extracted from the original information for counting objects. Preferably, the depth map and the original image include the same area of interest. In the depth map 230 of FIG. 4C, for a cubic effect, objects of interest are displayed in different colors according to the size of depth information on each region in the area of interest. The depth information in the depth map may be displayed unlike in FIG. 4C.

Referring to FIG. 4D, the system for counting objects generates a corrected depth map 240, by applying the edge information 220 to the depth map 230. In case of identifying objects of interest based on the corrected depth map 240, the system for counting objects may reduce errors occurring when identifying objects of interest based on only the original image 210. For instance, the system for counting objects can identify objects of interest regardless of colors, and can remove errors such as shadows occurring due to illumination. Further, the system for counting objects can obtain clear outlines of the objects, and can directly identify the objects without an additional effort to reduce such errors.

Figure 5:
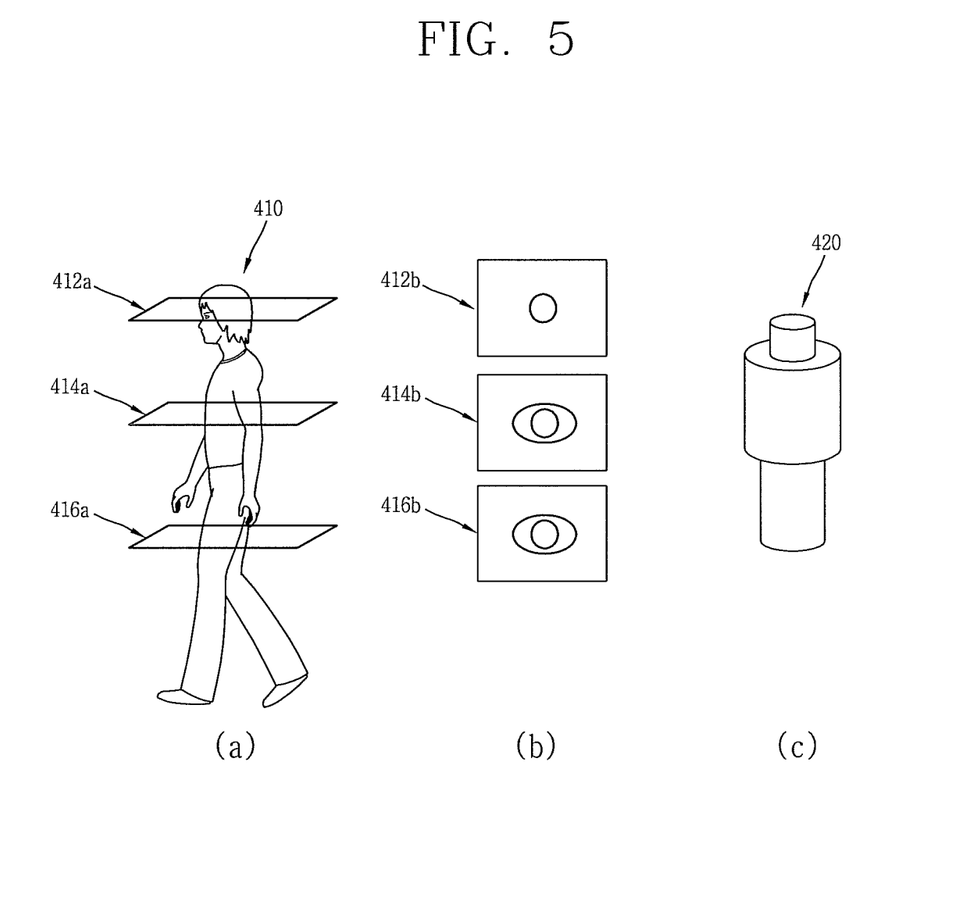
FIG. 5 is a view for explaining depth patterns used to identify the objects of interest of FIG. 3.

FIG. 5 is a view for explaining depth patterns used to identify the objects of interest of FIG. 3. With reference to FIG. 5, will be explained a method for identifying objects of interest using a depth pattern by the system for counting objects according to the present invention.

FIG. 5A schematically shows a method for extracting a depth pattern of an object of interest 410, under an assumption that the object of interest 410 is the human body. Generally, the camera apparatus of the system for counting objects according to the present invention, is installed above an area of interest. Accordingly, while performing an object modeling with respect to the object of interest, a depth pattern may be extracted based on information corresponding to virtual planes 412a, 414a and 416a crossing the object of interest 410 towards the lower side of the object of interest 410. That is, as shown in FIG. 5B, a plurality of information 412b, 414b and 416b corresponding to the virtual planes 412a, 414a and 416a, indicate the shape of the object of interest on the respective planes. Accordingly, in a case where the plurality of information 412b, 414b and 416b are accumulated on each other, an object model, i.e., a depth pattern 420 of the object of interest can be obtained as shown in FIG. 5C.

The depth pattern 420 of the object of interest has information which can be compared with depth patterns of the respective objects in the corrected depth map 240 of FIG. 4D. In S140 of FIG. 3 for identifying depth patterns of objects of interest, the system for counting objects compare depth patterns of objects in the corrected depth map, with the depth pattern 420 of the object of interest. In S140, a candidate region including factors of the object of interest, such as a height and an area, may be used for comparison of the depth patterns. It is determined whether the objects included in the corrected depth map have a result value more than a prescribed threshold, the result value obtained by comparing the depth patterns of the objects in the corrected depth map with the depth pattern 420. If the result value is more than the prescribed threshold, the system for counting objects may identify the objects in the corrected depth map as objects of interest.

Figure 6:
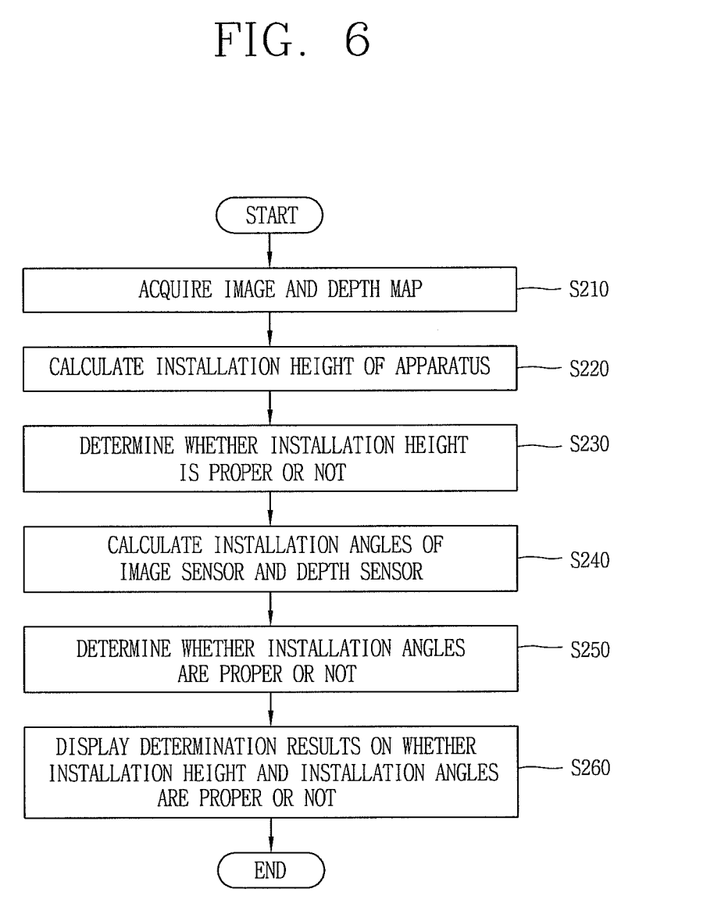
FIG. 6 is a flowchart showing a method for displaying determination results on whether a camera apparatus has been properly installed, in a system for counting objects according to the present invention.
Figure 7:
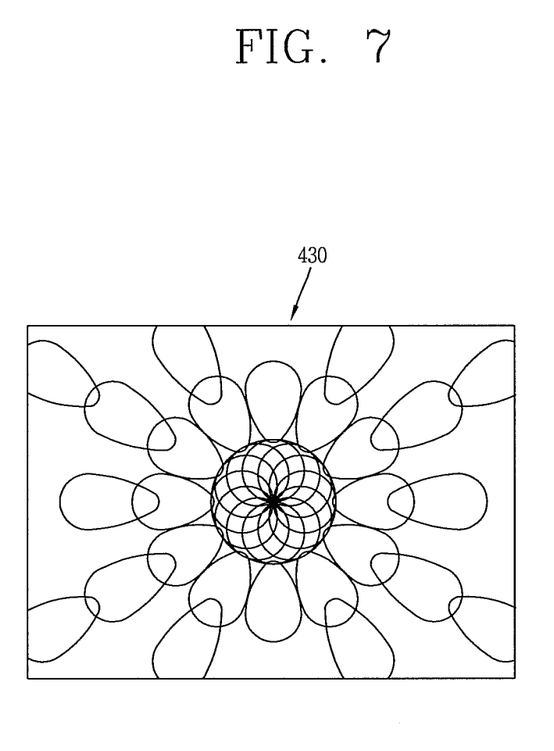
FIG. 7 is a view showing the principle of a depth pattern database used to determine whether installation angles of an image sensor and a depth sensor are proper or not, in a system for counting objects according to the present invention.

With reference to FIGS. 6 and 7, will be explained a method for determining whether the camera apparatus of the system for counting objects according to the present invention, has been properly installed. Here, the proper installation of the camera apparatus indicates the position of the camera apparatus configured to acquire basic information for counting objects, installed at a proper angle and at a proper height with respect to an area of interest where objects of interest are to traverse. Therefore, determining whether the camera apparatus has been properly installed or not, means determining whether an installation height of the camera apparatus is within an allowable range, and whether installation angles of the image sensor and the depth sensor of the camera apparatus are within an allowable range where the occurrence of errors can be minimized. To this end, the system for counting objects according to the present invention calculates an installation height of the camera apparatus based on a depth map, and calculates installation angles of the image sensor and the depth sensor based on a depth pattern database to be later explained.

FIG. 6 is a flowchart showing a method for displaying determination results on whether a camera apparatus has been properly installed, in a system for counting objects according to the present invention. FIG. 7 is a view showing the principle of a depth pattern database used to determine whether installation angles of the image sensor and the depth sensor are proper or not, in a system for counting objects according to the present invention.

Referring to FIG. 6, an original image of an area of interest is acquired from the image sensor 12 of the camera apparatus of the system for counting objects, and a depth map with respect to the area of interest is acquired from the depth sensor 14 of the camera apparatus (S210). The original image may include at least one object of interest. The system for counting objects uses a depth pattern database on a reference object having the same type as the objects of interest. For instance, in case of calculating objects under an assumption that the object is the human body, the system for counting objects uses a depth pattern database related to the human body.

Next, the system for counting objects calculates an installation height of the camera apparatus, based on the acquired depth information in the depth map (S220). Then, the system for counting objects determines whether the installation height of the camera apparatus is proper or not (S230). Since the depth information in the depth map is distance information, the installation height of the camera apparatus may be one of the depth information in the depth map.

Next, the system for counting objects calculates installation angles of the image sensor and the depth sensor, based on the depth map and the depth pattern database (S250).

The depth pattern database used to calculate the installation angles, stores therein depth patterns of a reference object at different angles. In a case where the reference object is the human body, an object modeling is performed with respect to the reference object, so as to extract the depth pattern 420 of the reference object shown in FIG. 5. When viewed at various angles, the depth pattern of the reference object has different shapes at different angles. Therefore, the depth pattern database may demonstrate depth patterns of the reference object in association with various angles. Referring to FIG. 7, the system for counting objects according to the present invention includes a depth pattern database 430 on the reference object, the depth pattern database 430 viewed from the upper side and radially displayed according to various angles. Accordingly, the installation angles of the image sensor and the depth sensor may be acquired by comparing the depth patterns of the objects of interest, with the depth patterns of the reference object stored in the depth pattern database, and then by selecting an angle corresponding to a depth pattern of the object similar to the depth pattern of the reference object.

The determination on whether the installation height and the installation angles are proper or not, may be executed by determining whether the calculated installation height and installation angles are within an allowable range, respectively.

Next, the system for counting objects displays determination results on whether the installation height and the installation angels are proper or not (S260). The determination results on whether the installation height and the installation angels are proper or not, may be displayed on a display attached to the camera apparatus, or on a display of a remote apparatus connected to the camera apparatus.

The display for displaying determination results on whether the installation height and the installation angels are proper or not, may be implemented as at least one lamp. And, the camera apparatus may control an on-off state, a blinking interval, a color or an intensity of illumination of said at least one lamp, based on the determination results on whether the installation height and the installation angels are proper or not. In a case where the camera apparatus controls an on-off state, at least one lamp may be turned-on if the installation state is good. In a case where the camera apparatus controls a blinking interval, at least one lamp may have a long blinking interval if the installation state is bad, but may have a shortened blinking interval if the installation state is nearly good. In this case, if the installation state is good, said at least one lamp may be continuously turned-on.

The display for displaying determination results on whether the installation height and the installation angels are proper or not, may be a apparatus having an additional monitor.

Hereinafter, will be explained modifications of a method for determining whether the camera apparatus of the system for counting objects according to the present invention, has been properly installed or not.

The method for determining whether the camera apparatus of the system has been properly installed or not according to a preferred embodiment of the present invention, may be implemented by performing the aforementioned steps (S110~S150) of FIG. 6 by the camera apparatus 10 under an assumption that the display is included in the camera apparatus.

The method for determining whether the camera apparatus of the system has been properly installed or not according to a modified embodiment of the present invention, may be implemented by transmitting information on original images and depth maps acquired by the camera apparatus 10 of the system to the remote controller 20 connected to the camera apparatus 10, and by executing the respective steps S120~S150 of FIG. 3 by the remote controller 20.

The invention claimed is:

1. A method for counting objects using an image sensor and a depth sensor, the method comprising:
   acquiring an image by the image sensor, and acquiring a depth map from the depth sensor, the depth map indicating depth information on the subject in the image;
   acquiring edge information of objects of interest in the image;
   generating a corrected depth map by applying the edge information to the depth map;
   extracting depth patterns of the objects of interest from the corrected depth map;
   identifying at least one valid object among the objects of interest by comparing the extracted depth patterns and reference depth patterns stored in a database; and
   counting the identified valid object,
   wherein the step of extracting depth patterns of the objects of interest comprises:
   selecting one of the objects of interest; and
   extracting a depth pattern, based on projection information on virtual planes crossing the selected object, while moving toward a lower side of the selected object.

2. The method of claim 1, wherein in the step of identifying at least one valid object, the reference depth patterns of a reference object stored in the database, is compared with the depth patterns of the corrected depth map.

3. The method of claim 1, further comprising tracking movement of the identified valid object.

4. A camera apparatus, comprising:
   an image sensor configured to generate an image captured with respect to objects of interest;
   a depth sensor configured to generate a depth map indicating depth information on the subject in the image; and
   a controller configured to acquire edge information of the objects of interest in the image, configured to generate a corrected depth map by applying the edge information to the depth map, configured to extract depth patterns of the objects of interest from the corrected depth map, configured to identify at least one valid object among the objects of interest by comparing the extracted depth patterns and reference depth patterns stored in a database, and configured to count the identified valid object,
wherein the controller is further configured to
  select one of the objects of interest, and
  extract a depth pattern, based on projection information on virtual planes crossing the selected object, while moving toward a lower side of the selected object.

5. The camera apparatus of claim 4, further comprising a memory configured to store therein the database for storing reference depth patterns of a reference object at different angles,
wherein the controller identifies the valid object among the objects of interest, using the reference depth patterns of the reference object at different angles, from the corrected depth map.

6. An apparatus for counting objects, comprising:
a transceiver configured to receive an image captured with respect to objects of interest, and a depth map indicating depth information on the subject in the image; and
a controller configured to acquire edge information of the objects of interest in the image, configured to generate a corrected depth map by applying the edge information to the depth map, configured to extract depth patterns of the objects of interest from the corrected depth map, configured to identify at least one valid object among the objects of interest by comparing the extracted depth patterns and reference depth patterns stored in a database, and configured to count the identified valid object,
wherein the controller is further configured to
  select one of the objects of interest, and
  extract a depth pattern, based on projection information on virtual planes crossing the selected object, while moving toward a lower side of the selected object.

7. The apparatus of claim 6, further comprising a memory configured to store therein the database for storing the reference depth patterns of a reference object at different angles,
wherein the controller identifies the valid object, using the reference depth patterns of the reference object at different angles, from the corrected depth map.

* * * * *